United States Patent [19]

Ando et al.

[11] 3,927,418

[45] Dec. 16, 1975

[54] CHARGE TRANSFER DEVICE

[75] Inventors: Tetsuo Ando, Ebina; Yoshimi Hirata, Hatano, both of Japan

[73] Assignee: Sony Corporation, Tokyo, Japan

[22] Filed: Sept. 5, 1974

[21] Appl. No.: 503,372

Related U.S. Application Data

[62] Division of Ser. No. 312,332, Dec. 5, 1972, Pat. No. 3,848,328.

[30] Foreign Application Priority Data

Dec. 11, 1971 Japan .............................. 46-100410

[52] U.S. Cl. .............. 357/24; 307/221 D; 307/304; 357/23; 357/55; 357/56

[51] Int. Cl.² .................... H01L 27/10; H01L 29/78

[58] Field of Search .................... 357/23, 24, 55, 56; 307/221 D, 304

[56] References Cited

UNITED STATES PATENTS

| | | | |
|---|---|---|---|
| 3,528,168 | 9/1970 | Adamic, Jr. | 357/23 |
| 3,660,697 | 5/1972 | Berglund et al. | 357/23 |
| 3,737,683 | 6/1973 | Sangster | 357/24 |
| 3,745,425 | 7/1973 | Beale et al. | 357/23 |
| 3,767,983 | 10/1973 | Berglund | 357/23 |

OTHER PUBLICATIONS

Ames et al., IBM Tech. Discl. Bull., Vol. 9, No. 1, June 1966, pp. 110–111.

Altman, "New Concept for Memory and Imaging . . .," Electronics, June 1971, pp. 50–59.

*Primary Examiner*—William D. Larkins
*Attorney, Agent, or Firm*—Hill, Gross, Simpson, Van Santen, Steadman, Chiara & Simpson

[57] ABSTRACT

An information storage and transfer device which has a plurality of capacitors and switching MOS-FET's between said capacitors, in which there are a plurality of island areas which serve as source and drain regions of the MOS-FET and which island areas are separated by a plurality of gutters.

7 Claims, 24 Drawing Figures

Fig-1
(PRIOR ART)
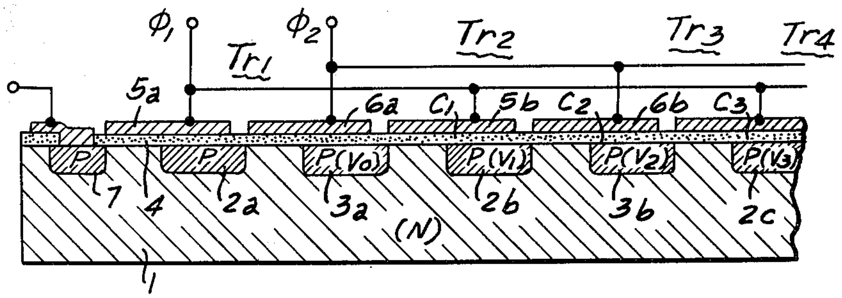
Fig-2
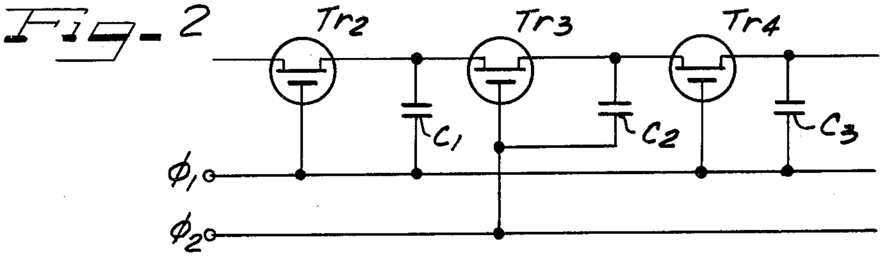
Fig-3
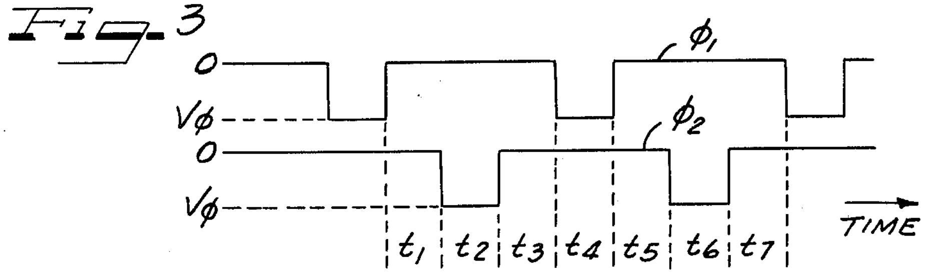
Fig-4
| | $V_1$ | $V_2$ |
|---|---|---|
| $t_1$ | 0 | $V\phi - Vte$ |
| $t_2$ | $V\phi - Vte$ | $V\phi$ |
| $t_3$ | $V\phi - Vte$ | 0 |
| $t_4$ | $V\phi - Vte$ | $V\phi - Vte$ |
| $t_5$ | $V\phi - Vte$ | $V\phi - Vte$ |
| $t_6$ | $V\phi-(Vte-\Delta Vte)$ | $2V\phi-(Vte+\Delta Vte)$ |
| $t_7$ | $V\phi-(Vte+\Delta Vte)$ | $V\phi-(Vte-\Delta Vte)$ |

CHARGE TRANSFER DEVICE

This is a division of application Ser. No. 312,332, filed Dec. 5, 1972, now U.S. Pat. No. 3,848,328.

BACKGROUND OF THE INVENTION

This invention relates to an information storage and transfer device, and more particularly to a monolithic semiconductor apparatus adapted for storing and sequentially transferring electric charges which represent information.

Such devices are often called "bucket-brigade devices" and certain original forms of such devices were first disclosed at the 1970 International Solid State Circuits Conference by F. L. J. Sangster of Philips Research Laboratory. Subsequently, a United States Patent disclosing an original of such device was issued on Nov. 16, 1971 as U.S. Pat. No. 3,621,283.

The general concept of a bucket-brigade device, hereinafter sometimes referred to as "B.B.D.", was also described in an article in the "Philips Technical Review", vol. 31, 1970, No. 4, pp. 98–110, entitled "The 'bucket-brigade delay line', a shift register for analogue signals."

In this article, the underlying concept of the B.B.D. was described by pointing out that the principle of such a register is quite simple. Sampled values of an analogue signal are stored in the form of charges on a series of capacitors. Between each of these storage capacitors is a type of "switch" that transfers the charges from one capacitor to the next on a command from a clock pulse. Since each storage capacitor cannot take up its new charge until it has passed on the old one, only half the capacitors carry information and the ones in between are empty.

The B.B.D. is utilized as shift registers, memory devices or image sensors built in one semiconductor chip.

OBJECTS OF THIS INVENTION

It is an object of the present invention to provide an improved device for information storage and transfer.

It is another object of the invention to provide an improved bucket-brigade device utilizing an improved form of MOS-FET as switching devices. The term MOS-FET as used herein refers to a metal-oxide-semiconductor field effect transistor.

It is another object of the invention to provide improved transfer efficiency of the information of such a device.

BRIEF DESCRIPTION OF THE DRAWINGS

FIG. 1 is a diagrammatical cross-sectional view of one form of prior art B.B.D.;

FIG. 2 is a circuit with which the device of FIG. 1 may be employed;

FIG. 3 diagrammatically illustrates the functioning of the device with respect to time;

FIG. 4 is a chart to explain a phenomenon which occurs in the prior art device of FIG. 1;

DESCRIPTION OF THE PRIOR ART

Figure 5:
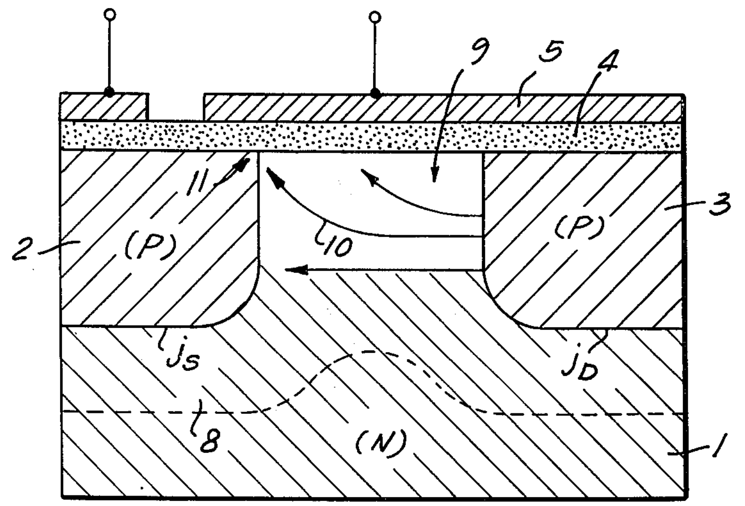
Fig. 5 (PRIOR ART)
FIG. 5 is an enlarged fragmentary view of a portion of the prior art B.B.D. shown in FIG. 1.

FIG. 1 shows in a diagrammatic cross-sectional view a known form of B.B.D. It comprises a semiconductor body 1 of silicon having an N-type conductivity, a plurality of P-type areas, the first group of island areas 2*a*, 2*b*, 2*c* and a second group 3*a*, 3*b* at a major face of the silicon substrate 1, arranged uni-directionally, an insulating layer 4, for example silicon dioxide ($SiO_2$) covering the plural areas and the major surface of the silicon, a plurality of metal layers, including a first group 5*a*, 5*b* and 5*c* and a second group 6*a* and 6*b*, on the insulating layer 4, an input terminal area 7 of P-type conductivity making a P-N junction with the substrate 1. The first group of metal layers 5*a*, 5*b*, and 5*c* are electrically connected to each other, where the first gate potential $\phi_1$ is applied simultaneously.

The second group of metal layers 6*a* and 6*b* are electrically connected to each other, where the second gate potential $\phi_2$ is applied simultaneously.

The first metal-oxide-semiconductor field effect transistor (MOS-FET) T*r*1 consists of one of the first island group 2*a* (source region), one of the second island group 3*a* (drain region), a silicon-dioxide layer 4 and one of the second metal group 6*a* (gate electrode).

The second MOS-FET Tr.2 similarly consists of the islands 3*a* (source region), 2*b* (drain region), isolating layer 4 and the metal layer 5*b* (gate electrode).

The third and fourth transistors also similarly consist of corresponding elements, as shown in FIG. 1.

These plural transistors operate as "switches," as described in the aforesaid article in the "Philips Technical Review."

Capacitors consist of metal-insulating layer-semiconductor island components, such as C1, C2 and C3. The term "metal-insulating layer-semiconductor" will herein be referred to as "MIS".

FIG. 2 shows the equivalent circuit of the B.B.D. of FIG. 1 including capacitors C1, C2, C3 and MOS-FET's T*r*2, T*r*3, T*r*3.

In FIG. 3, potential diagrams are shown in full lines. Potentials $\phi_1$ and $\phi_2$ applied to gate lines are select between 0 volt and negative $V\phi$ volt sequentially in order to transfer charges, such as minority carriers which represent information.

When the potential is of higher voltage, such as, 0 volts, the MOS-FET switches are closed and the capacitors store the information. When the potential is of lower voltage such as $V\phi$ volt, the switches are opened and the capacitors are discharged.

In the periods *t*1, *t*3, *t*5 and *t*7, the higher voltage (i.e. zero), is applied on both potentials $\phi 1$ and $\phi 2$, and the information is stored in each capacitor.

In periods *t*2 and *t*6, the lower pulse $V\phi$ volt is applied on only the potential $\phi 2$.

On the other hand at the period *t*4, $V\phi$ is applied on only the potential $\phi 1$.

The information is transferred in these periods *t*2, *t*4 and *t*6 from a certain capacitor to the next.

The maximum electric charge which is stored and transferred is $Q=-(V\phi-Vte)\ C$, where $V\phi$ is the negative gate voltage shown in FIG. 3, $Vte$ is the effective threshold voltage of the MOS-FET T*r*1 etc. and C is the capacitance of the capacitor C1 etc. in FIGS. 1 and 2.

However, the transfer or transport efficiency is not enough for high speed clock pulses such as 10 MHZ or greater which are used in video signal systems.

The changing value of voltage of island areas is shown in the chart of FIG. 4 corresponding to each of the periods *t*1, *t*2 and so forth.

The information has a lot of states between the maximum value Qmax = −(Vφ−V*te*)C and the minimum value Qmin = 0. When the charges Qmax = [1] and Qmin = [0] are transferred from the island area 2*b* to 3*b*, the source and drain regions of T*r*3, we observed that the information [0] is changed during transfer period.

First of all in period t1, the capacitor C1 is filled with information charges and the area 2b is held at V1=0 volt, the capacitor C2 is vacant and the area 3b is held at V2 = Vφ−V*te* <0.

In transfer period *t*2, φ2 = Vφ <0, the channel occurs between the source 2*b* and the drain 3*b*, and charges are transferred through this channel. As a result, the area 2*b* becomes vacant and V1 = Vφ − V*te*, the area 3*b* becomes filled and V2 = Vφ.

In the period *t*3, φ2 = 0, V1 = Vφ − V*te* and V2 = 0, where charges are stored in the capacitor C2.

In the period *t*4, φ1 = Vφ, the information [1] changes from the capacitor C2 to the next capacitor C3 and the next information [0] appears in the capacitor C1 simultaneously.

In the period t5, V1 = Vφ − V*te* is holding the information [0] in the capacitor C1 and the capacitor C2 is vacant.

In the next period t6, the information [0] is transferred from C1 to C2. In this period, the modulation of the effective threshold voltage V*te* is obtained and V1 becomes Vφ − (V*te* − ΔV*te*) and V2 becomes 2Vφ − (V*te* + Δ V*te*).

In the period *t*7, V1 becomes Vφ − (V*te* + ΔV*te*) and V2 becomes Vφ − (V*te* − ΔV*te*). Ideally, V1 should be Vφ − V*te* and V2 should be also Vφ − V*te*.

It is believed that the cause of the reduction of the efficiency lies in the fact that the potential of the drain region has an effect on the value Vte and the maximum value of the transferred information.

The structure of the device is considered to cause these effects on the value Vte at the channel region of the MOS-FET, especially due to the position of the drain region of each MOS-FET.

The effect of a drain modulation is explained in FIG. 5, where an enlarged partial view of the B.B.D. of FIG. 1. Only one MOS-FET is shown there, and this comprises a semiconductor substrate 1 of N-type, one of the first group of island areas 2 of P-type semiconductor material, one of the second group of island area 3 of P-type semiconductor material, an insulating layer 4 ($SiO_2$), a gate metal electrode 5, a P-N junction *j*S and *j*D, a depletion layer 8 caused by the back-biased P-N junctions, a channel region 9 between island areas, a line of electric force are shown at 10.

When the line of electric force 10 extends to the edge 11 of the junction *j*S, it changes the value V*te*.

To enlarge the distance between two neighboring junctions *j*S and *j*D, that is, the channel length, results in reducing the modulation or the influence of the line of electric force.

However, a long channel reduces the current amplification factor of the MOS-FET and causes also the reduction of the transfer velocity of the information.

DESCRIPTION OF THE PREFERRED EMBODIMENT

Figure 6:
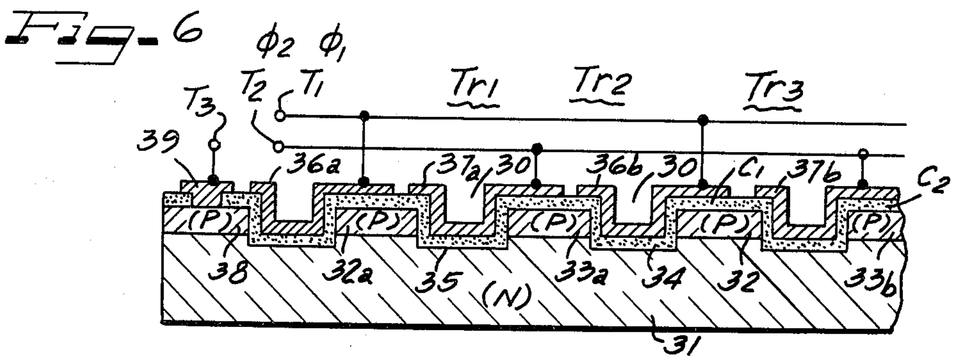
FIG. 6 is a diagrammatic cross-sectional view of a charge transfer device embodying the present invention.
Figure 8:
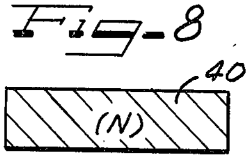
FIGS. 8 to 24 diagrammatically illustrate process steps by which the structure of the present invention may be fabricated.
Figure 14:
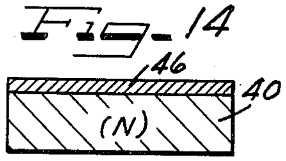
Figure 20:
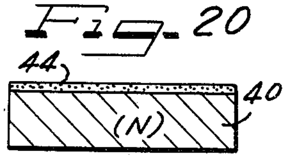

FIG. 6 shows the improved B.B.D. of this invention. As shown, there is provided a semiconductor body 31, such as N-type silicon substrate; a plurality of gutters 30 in the body 31; a plurality of the island areas 32*a*, 33*a*, 32*b* and 33*b* of P-type silicon arranged unidirectionally on the N-type substrate; an insulating layer 35 such as silicon-dioxide ($SiO_2$), on the uneven surface of the silicon making channel region 35 between the P-type area islands; a plurality of metal layers 36*a*, 37*a*, 36*b* and 37*b* disposed on the $SiO_2$ layer 34 the first group of metal electrodes 36*a* and 36*b* being connected to each other by a lead extending to the first end terminal T1; the second group of metal electrodes 37*a* and 37*b* being connected by another lead extending to the second end terminal T2; an input area 38 of P-type silicon; and an input electrode 39 connected to the third terminal T3.

A plurality of MOS-FET's T*r*1, T*r*2 and T*r*3 are formed and arrayed uni-directionally.

The first transistor Tr1 consists of P-type island 32*a* forming a source region, a next island 33*a* forming a drain region, an insulating layer 34 forming a gate insulator and a metal layer 37*a* forming a gate electrode. Other transistors are similarly formed The equivalent circuit of the B.B.D. is also represented in FIG. 2. This is also operated in accordance with the diagram shown in FIG. 3. Selected potentials φ1 and φ2 are applied on terminals T1 and T2 respectively.

Figure 7:
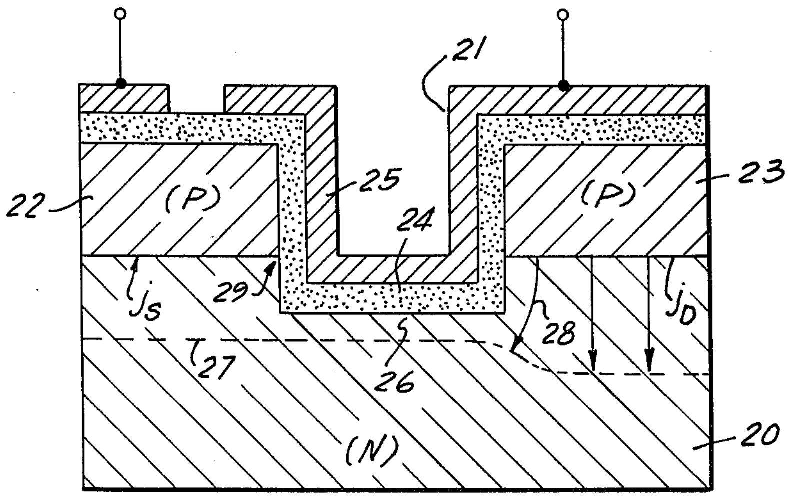
FIG. 7 is an enlarged fragmentary view of a portion of FIG. 6 showing this invention.

FIG. 7 shows an enlarged partial view of the B.B.D. of the present invention and comprises an N-type silicon substrate 20; two neighboring island areas 22 and 23 of P-type an insulating layer 24 ($SiO_2$) which covers the uneven surface of the silicon; a metal gate electrode 25 which forms the channel region 26 beneath the $SiO_2$ layer 24; and a depletion layer 27 which is formed when P-N junctions *j*S and *j*D are backbiased by transferring charge and gate potential. In this structure the array of P-type island areas 22 and 23 are deposited higher than the channel region 26, forming the gutter 21 between two island areas 22 ans 23. The shape of the P-N junction jS, jD is flat and there is no curvature in the cross-sectional direction along the array of MOS-FETs.

The line of electric force 28 is shown in the figure, and has a negligible small influence on the channel region and the value V*te*, because the line 28 merely extends to the edge portion 29 of the source area 22 from the drain area 23.

As a result of this structure, the small amount ΔV*te* in FIG. 4 becomes approximately zero, and the constant value of V*te* makes the transfer efficiency of the charge larger than the prior art without reduction of the transport velocity.

METHOD OF FABRICATING THE STRUCTURE OF THE PRESENT INVENTION

Figure 9:
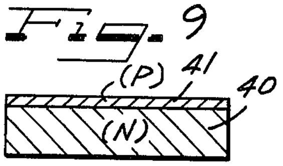
Figure 10:
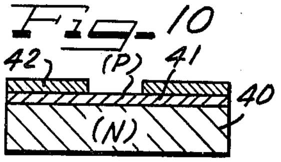
Figure 16:
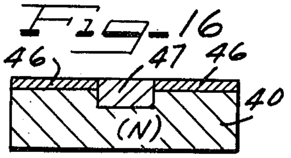
Figure 22:
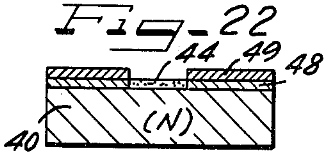
Figure 11:
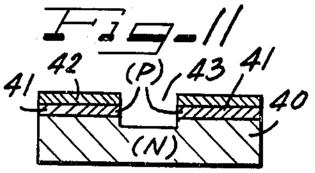
Figure 12:
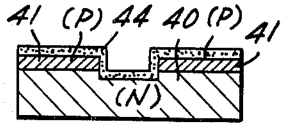
Figure 13:
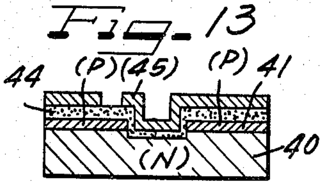
Figure 19:
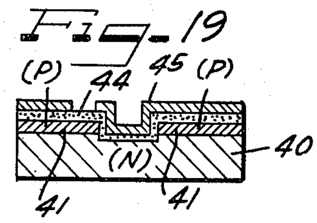

A first method of fabrication is shown in FIG. 8 to FIG. 13 and will now be described. In the N-type silicon 40 (FIG. 8), a P-type layer 41 is formed by a diffusion technique (FIG. 9). A thermal silicon-dioxide ($SiO_2$) layer 42 is formed on the P-type layer and etched selectively to expose the silicon surface (FIG. 10). The P-type layer 41 is selectively etched chemically so that the N-type substrate is exposed (FIG. 11) and a plurality of islands are formed arrayed unidirectionally. A second insulating layer 44 is formed by oxidation covering the exposed N-type surface and P-type islands (FIG. 12). A metal layer, for example aluminum (Al), is deposited on the second insulating layer 44 and selectively etched forming a plurality of gate electrodes 45 (FIG. 13).

Figure 15:
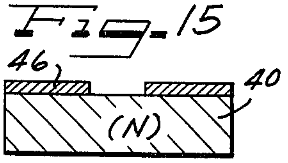
Figure 17:
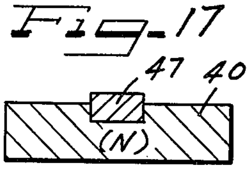
Figure 18:
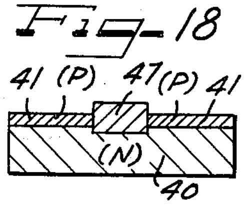

A second method of fabrication of a device embodying the present invention is shown in FIG. 14 to FIG. 19. The N-type silicon substrate 40 is covered by a $Si_3N_4$ layer 46 (FIG. 14) and the layer 46 is etched selectively making a plurality of windows (FIG. 15). After selective thermal-oxidation a thick silicon-dioxide ($SiO_2$) layer 47 (FIG. 16) is formed, and the silicon-nitride layer ($Si_3N_4$) is removed (FIG. 17). The P-type layer is selectively formed by a diffusion technique forming a plurality of island areas unidirectionally arrayed (FIG. 18). The depth of the layer 41 is shallower than the bottom of the $SiO_2$ layer 47. After the $SiO_2$ layer 47 is removed, the second oxide layer 44 is formed covering the N-type surface and P-type island areas. The plurality of metal layers 45 deposited (FIG. 19) to form gate electrodes.

Figure 21:
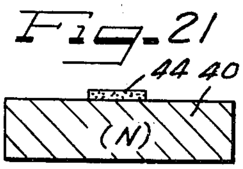
Figure 23:
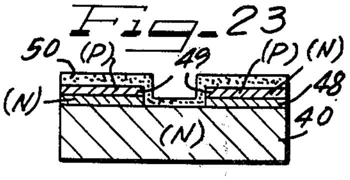
Figure 24:
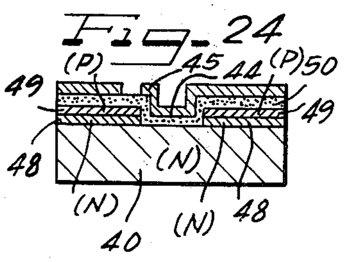

A third method of fabrication is shown in FIG. 20 to FIG. 24. A gate insulator 44, such as $SiO_2$, is formed on the N-type silicon substrate 40 (FIG. 20), and etched selectively (FIG. 21). Double epitaxial layers 48 and 49 are formed on the exposed silicon surface. The first layer 48 is N-type, the same as the substrate 40, and the second layer 49 is of P-type forming a plurality of island areas unidirectionally. The final insulating layer 50 is deposited on the island layer and the gate oxide layer (FIG. 23). A plurality of gate metal layers 45 are deposited selectively on the surface of the final insulating layer 50 (FIG. 24).

I claim as my invention:

1. A charge transfer device comprising: a semiconductor substrate of a first conductivity having an uneven surface formed of square cornered notches; at least two semiconductor switches each having a source, drain, channel and gate region; said drain and source regions being positioned higher than said channel region and being of opposite conductivity such that P-N junctions are formed above the surface of said substrate between said drain and source regions; an insulating layer covering said source, drain and channel regions of each semiconductor switch and forming a capacitor in parallel with said gate and drain regions.

2. A charge transfer device comprising: a semiconductor substrate having a first type of conductivity formed with square cornered notches; a plurality of island areas of the second type conductivity arrayed unidirectionally and projecting from said substrate and forming with said substrate P-N junctions which lie in plane offset from the plane portion of the substrate between said island areas; an insulating layer covering said island areas and portions of said substrate therebetween; and a plurality of gate electrodes arranged along said island areas and said substrate and forming a plurality of switching devices and capacitors.

3. A charge transfer device comprising: a semiconductor substrate of one conductivity type, at least two semiconductor switches each having island areas of opposite conductivity type formed on said substrate, said island areas being separated from each other by square cornered gutters such that P-N junctions are formed which lie in a plane above the bottoms of said gutters; an insulating layer covering said island areas and said gutters; and a plurality of gate metal layers on said insulating layer over said island areas and said gutters.

4. A charge transfer device comprising: a semiconductor substrate wafer of one conductivity type; a plurality of islands in said wafer of opposite conductivity type located adjacent one surface of said wafer, square cornered gutters formed in said wafer between said islands such that P-N junctions are formed in a plane offset from the bottom of said gutters; adjacent portions of said islands forming source and drain regions; an insulating layer covering said islands and said gutters; regions below said gutters forming channel regions connecting said source and drain regions lying in a plane below said P-N junctions formed between said source and drain regions and said substrate and metal electrodes connected to said source, gate and drain regions to provide input electrodes and capacitance with said insulating layer and said substrate and said capacitance connected in shunt across each drain region and its associated gate region.

5. A device according to claim 4 in which a source region of one transistor is electrically connected to the drain region of the next succeeding transistor.

6. A device according to claim 5 in which there is provided two lines for receiving shift signals which are substantial square wave pulses which alternate in time with respect to each other, means for connecting the gate electrode of alternate transistors to one of said lines and means for connecting the gate electrodes of the remaining transistors to the other of said lines.

7. A charge transfer device comprising: a semiconductor substrate of a first conductivity type; a plurality of islands of opposite conductivity type formed on said substrate and aligned such that portions of said islands serve as a drain for a source on an adjacent island and other portions of said islands serve as a source for another adjacent island, gutters having straight side walls and a straight bottom formed in said substrate between said islands such that P-N junctions between said islands and said substrate lie in a plane above the bottoms of said gutters and which intersect said side walls, a layer of insulation on said islands and the side walls and bottoms of said gutters, a first plurality of conductive layers overlying alternate gutters and substantial portions of one of the adjacent alternate islands, and a second plurality of conductive layers overlying the gutters between said alternate gutters and substantial portions of the remaining islands.

* * * * *